3,523,333
SOLE MOLD ASSEMBLIES
John J. Taylor, and William T. Jordan, Leicester, England, assignors to USM Corporation, Flemington, N.J., a corporation of New Jersey
Filed July 25, 1968, Ser. No. 747,718
Claims priority, application Great Britain, Sept. 22, 1967, 43,140/67
Int. Cl. B29c 1/00; B29h 7/08
U.S. Cl. 18—42                                                7 Claims

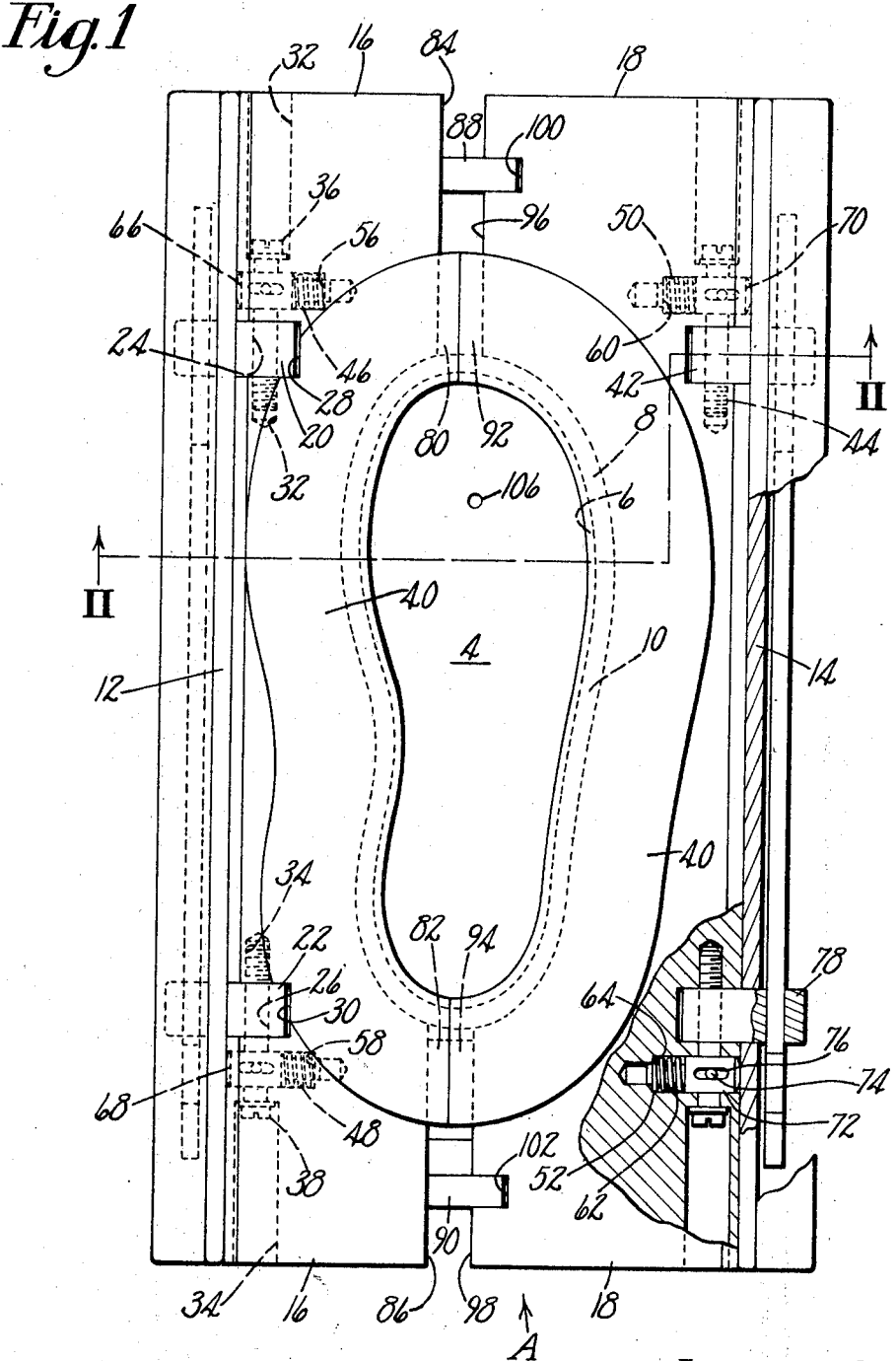

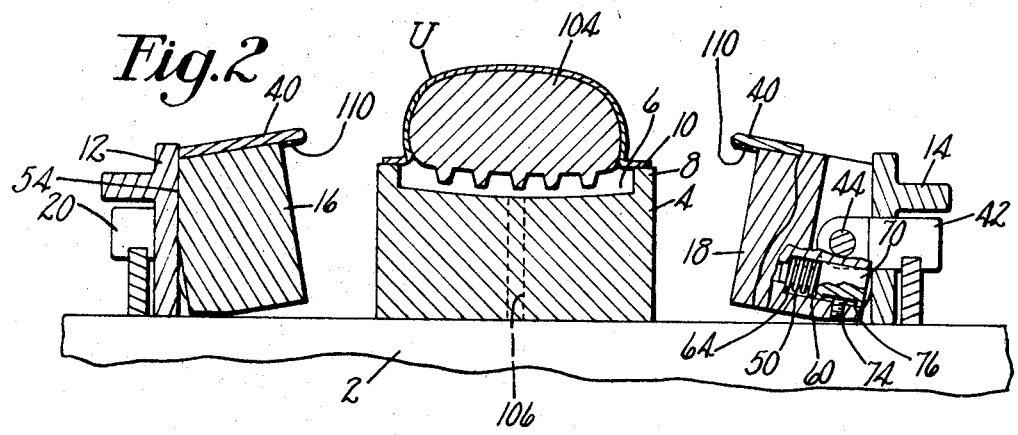
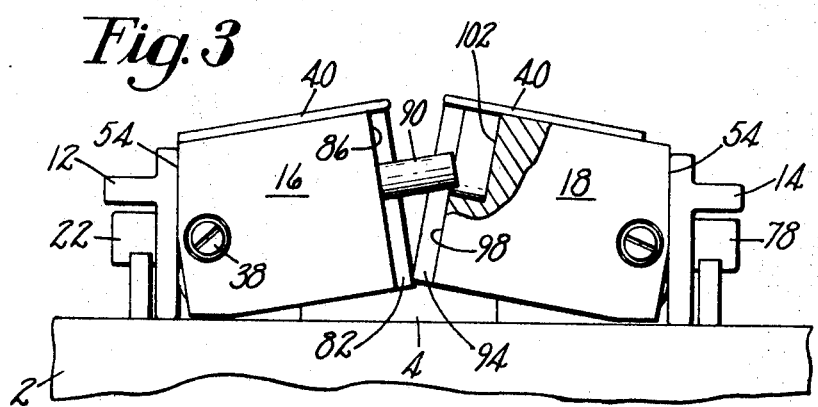

ABSTRACT OF THE DISCLOSURE

A mold assembly for use in the molding of a shoe bottom onto an upper. The assembly comprises a bottom mold member provided with a recess having the configuration of a shoe bottom unit, the recess being bounded by an upstanding wall. Side mold members are pivotally mounted on carriers movable toward and away from the bottom mold member, the side mold members being engageable with each other. Means responsive to the engagement of the side mold members are provided to move the side mold members pivotally whereby to move welt plates mounted on the side mold members toward the edge of the upstanding wall.

BACKGROUND OF THE INVENTION

Field of the invention

This invention relates to shoe sole molding and is directed more particularly to a mold assembly for molding a sole unit directly to a lasted upper.

Description of the prior art

The molding of soles onto lasted uppers is now commonplace in the shoemaking art and is generally accomplished with a mold assembly comprising a bottom mold member for forming the bottom surface of a molded sole, side mold members for forming the edge surfaces of the sole, a top mold member comprising a footform for mounting a lasted upper, and welt plate means attached to the side mold members for forming the welt extension portion of the molded sole as well as for effecting a close fit with the upper for preventing the escape of molding material from the mold cavity. The side mold members are generally movable laterally toward and away from the bottom mold member whereby to move the welt plates into and out of position for engagement with the upper. An example of the usual arrangement of mold members may be found in U.S. Pat. No. 3,358,333, issued Dec. 19, 1967 in the names of C. J. Kitchener et al.

More recently, it has become desirable to provide a shoe having an injection molded sole and in which the upper is flanged outwardly in the area of the feather line of the upper, rather than lasted to the bottom of the footform on which the upper is mounted. As may be appreciated, mold assemblies of the type above described are not appropriate for the manufacture of such shoes, there being no facility for the accommodation of an outflanged upper.

SUMMARY OF THE INVENTION

It is an object of the present invention to provide a mold assembly suitable for injection molding of soles onto uppers having outflanged marginal portions.

With the above and other objects in view, as will hereinafter appear, a feature of the present invention is the provision of a mold assembly comprising a sole mold member provided with a recess having the configuration of a sole and bounded by an upstanding wall, side mold members pivotally mounted, means for moving the pivotally mounted side mold members laterally toward the sole mold member, and means for moving the side mold members pivotally whereby to engage the outflanged portion of the upper and press the outflanged portion into sealing engagement with the edge of the upstanding wall.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which there is shown an illustrative embodiment of the invention from which its novel features and advantages will be apparent.

FIG. 1 is a plan view partially cut away, of one form of mold assembly illustrative of an embodiment of the invention;

FIG. 2 is a sectional view, taken along line II—II of FIG. 1 and showing the mold assembly in open condition and with a footform, carrying a shoe upper, positioned adjacent the recess of the sole mold member;

FIG. 3 is an end elevation, partly in section, taken in the direction of the arrow A of FIG. 1, showing the mold assembly in an intermediate condition;

DESCRIPTION OF THE PREFERRED EMBODIMENTS

Figure 4:
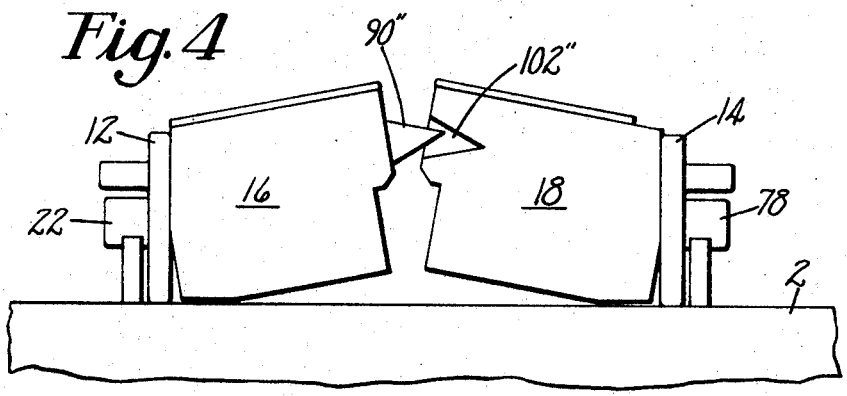
FIGS. 4 and 5 are similar to FIG. 3, but show alternative embodiments of a portion of the mold assembly.

Referring to FIGS. 1 and 2, it may be seen that the illustrative mold assembly includes a base plate 2 on which is mounted a sole mold member 4. The sole mold member has a recess 6 having the configuration of a sole unit and is bounded by an upstanding wall 8 having a free edge or upper-engaging surface 10.

Mounted on the base plate 2 for lateral movement toward and away from the sole mold member 4 are side mold carriers 12, 14 which pivotally support side mold members 16, 18, respectively.

Referring to the side mold carrier 12, it will be seen that the carrier includes two lugs 20, 22, each provided with a bore 24, 26 respectively, the axes of the bores being colinear. The lugs 20, 22 are received in recesses 28, 30 of the side mold member 16. Extending from opposite end portions of the side mold member 16 are two bores 32, 34, the axes of the bores 32, 34 being in alignment with the bores 24, 26 of the lugs 20, 22. A screw 36, 38 is received in each of the bores 32, 34 and extends through the bores 24, 26 of the lugs 20, 22. Thus, the screws 36, 38 pivotally connect the side mold member 16 to the side mold carrier 12. It will be appreciated that the same structure is found with respect to the side mold carrier 14 and the side mold member 18. The side mold members 16, 18 are provided with welt plates 40 which are engageable with a footwear upper, as will be described below.

Referring to FIG. 2, it will be seen that the carrier 14 pivotally supports the side mold member 18 by way of a lug 42 and screw 44 similar to the lug 20 and screw 32 above described with respect to the side mold member 16. Referring to FIGS. 1 and 2 there is disclosed means to urge the side mold members about their respective pivot axes in such a manner as to raise the free edges of the welt plates 40 above the level of the edge 10 of the wall 8.

Such means include coil springs 46, 48, 50, 52 acting between the side mold members and their respective side mold carriers. The side mold members are urged by the coil springs into a position (FIGS. 2 and 3) in which an engagement surface 54 of the side mold members abuts their respective side mold carriers. Each coil spring is located within a bore 56, 58, 60, 62, respectively, each spring acting between a shoulder 64 (FIGS. 1 and 2) of its associated bore and plunger members 66, 68, 70, 72 slidably mounted in each bore. Each plunger member is retained in its respective bore by a pin 74 extending through the respective side mold member and into an elongated slot 76. In the open position, as illustrated in FIGS. 2 and 3, the plunger members are pressed against the respective side mold carriers, urging the side mold members about their respective pivot axes and the welt plates 40 upwardly and away from the edge 10 of the wall 8.

The illustrative mold assembly also includes means (not shown) adapted to move the lugs 20, 22, 42 and a lug 78 linearly, generally widthwise of the bottom mold member 4, and toward and away from the bottom mold member whereby to move the respective pivot axes of the side mold members toward and away from the bottom mold member. The mechanism utilized to move the side mold carriers may be the usual side mold moving mechanism, such as that described in the above-mentioned U.S. patent to Kitchener which by reference is incorporated herein.

The side mold member 16 has affixed thereto two abutment plates 80, 82, the abutment plate 80 being located at the forepart portion of the side mold member and the abutment plate 82 being located at the backpart of the side mold member. Extending from inwardly facing planar surfaces 84, 86 of the side mold member 16 are two guide pins 88, 90. In like manner the side mold member 18 has fixed thereto two abutment plates 92, 94, the abutment plate 92 being located at the forepart portion of the side mold member and the abutment plate 94 being located at the backpart of the side mold member. Extending through inwardly facing planar surfaces 96, 98 are two guide slots 100, 102 for receiving the guide pins 88, 90, respectively.

In operation, a mold closing mechanism, such as that described in the above-mentioned patent, is used to move the axes of the pivots, and hence the two side mold members, toward the bottom mold member, the side mold members maintaining the attitudes in which they are shown in FIG. 2 with the welt plates being urged by the springs away from the edge 10 of the wall 8 and the surfaces 54 remaining in engagement with the side mold carriers 12 and 14. On movement of the mold assembly into an intermediate position (shown in FIG. 3), the guide pins 88, 90 each move into one of the guide slots 100, 102 and the two abutment plates 80, 82 each engage one of the abutment plates 92, 94. Upon further operation of the mold closing mechanism to move the two pivot axes toward the sole mold member, the side mold members are moved about the axes of their pivots against the action of the coil springs and the mold assembly moves into a closed condition, the welt plates 40 moving toward the edge 10 of the wall 8.

In the use of the illustrative mold assembly, a shoe upper $u$ is mounted on a footform 104 (FIG. 2) which is positioned proximate to the recess 6 of the bottom mold member 4, outflanged portions of the upper overlying the edge 10 of the wall 8.

As the mold closing mechanism is operated in accordance with the above description, the side mold members engaging and moving against the action of the springs about the axes of their pivots, the welt plates 40 engage the upper $u$, pressing it at the featherline into a sealing engagement with the footform and also pressing the outflanged portion of the upper into a sealing engagement with the surface 10 of the upstanding wall 8.

Fluid injection molding material is then injected into the recess 6 through a sprue bore 106, whereby to mold a shoe bottom directly onto the upper $u$. On opening of the mold assembly, a shoe is removed from the footform and the peripheral margin of the outflanged portion is trimmed off to a point even with the edge of the molded sole.

Figure 5:
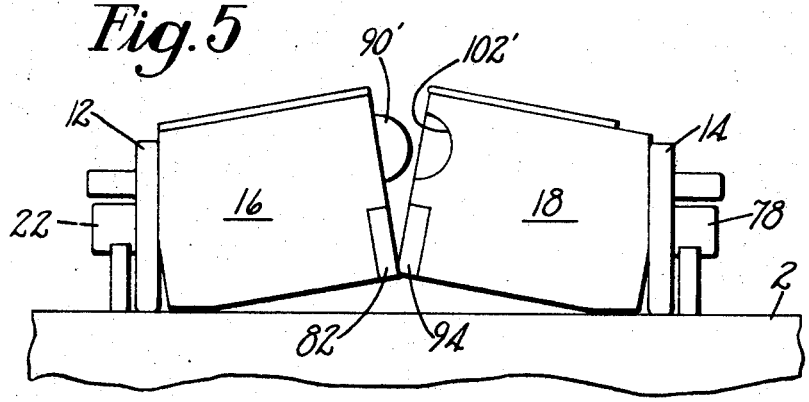

Referring to FIG. 5, it will be seen that the location member 90' may be of a semi-cylindrical shape and the location recess 102' complementarily shaped to receive the semi-cylindrical member.

Referring to FIG. 4, there will be seen still another alternative embodiment. In this instance the abutment plates 80, 82, 92, 94 are not present inasmuch as the location members and the walls of the recesses operate to pivot the side mold members 16, 18 about their respective axes. In this embodiment the location member 90" is triangular in cross section and the corresponding location recess 102" is also triangularly shaped to receive the location member. To minimize tendency of jamming, it is preferable to provide the location recess 102" with an apex angle minimally larger than that of the location member 90". In the operation of the device illustrated in FIG. 4, the movement of the side mold members toward one another causes the location member 90" to enter the location recess 102". On engagement of camming surfaces of the location member with cooperative surfaces of the location recess, the two side mold members are cammed downwardly about their pivots, against the action of the coil springs, moving the welt plates toward the edges of the upstanding wall 8 on the bottom mold member 4.

If desired, there may be secured to the under surface of each welt plate 40 a sealing member 110 of resiliently deformable material, such as silicone rubber in sheet form, which in the closed positions of the side mold members 16, 18 abut the upwardly-facing surface of the outflanged margin of the upper and the edge 10 of the upstanding wall 8 for sealing purposes.

Since certain obvious changes may be made in the illustrated device without departing from the scope of the invention, it is intended that all matters contained herein be interpreted in an illustrative and not a limiting sense.

Having thus described our invention, what we claim is new and desire to secure by Letters Patent of the United States is:

1. Mold assembly for the molding of a sole onto a footwear upper, said mold assembly comprising a bottom mold member having a recess in one surface thereof, the recess having the configuration of a footwear sole, a wall portion of said bottom mold member surrounding said recess and having an upper-engaging surface, side mold carriers movable toward and away from said bottom mold member, side mold members engageable with each other and having welt plates mounted thereon, said side mold members being pivotally mounted on said side mold carriers for movement of said welt plates downwardly toward said bottom mold member, and location means adapted to cause simultaneously pivotal movement of the side mold members to move the welt plates into a position adjacent said surface of said bottom mold member.

2. The invention according to claim 1 in which said location means comprises location member means and location recess means associated with said side mold members, said location recess means receiving said location member means when said side mold members engage one another.

3. The invention according to claim 2 in which there are first and second side mold members, said location member means being disposed on the first side mold member, and said location recess means being disposed in the second side mold member.

4. The invention according to claim 2 in which said side mold members include abutment portions engageable to pivot said side mold members on said side mold carriers.

5. The invention according to claim 2 in which the position of said side mold members relative to said side mold carriers is influenced by spring means acting between each side mold member and its associated side mold carrier.

6. Mold assembly for the molding of soles onto footwear uppers, said assembly comprising a bottom mold member having an integral wall structure defining a recess in one surface, said recess being of a preselected sole configuration, said wall structure having an uninterrupted inside surface for the forming of the edge of a shoe sole and a free edge adapted to receive an outflanged portion of an upper mounted on a footform proximate to said bottom mold member and said footform and said upper being positionable to define a closed mold cavity, side mold members engageable with peripheral portions of said bottom mold member, welt plates attached to the side mold members, side mold carriers pivotally mounting said side mold members for movement toward one another and downwardly toward said bottom mold member, side mold members having location members and location recesses associated therewith, said location recesses receiving said location means when said side mold members are moved toward one another and engage one another, whereby to cause said side mold members to pivot simultaneously whereby to move said welt plates into engagement with the upper outflanged portion to press said outflanged portion against said edge of said wall.

7. The invention according to claim 1 including sealing means fixed to said welt plates and adapted to engage said upper proximate to said bottom mold member wall portion upper-engaging surface.

References Cited

UNITED STATES PATENTS

| | | |
|---|---|---|
| 627,840 | 6/1899 | Butterfield. |
| 774,865 | 11/1904 | Butterfield. |
| 1,111,436 | 9/1914 | Butterfield. |
| 2,830,324 | 4/1958 | Farmer et al. |
| 2,937,405 | 5/1960 | Berggren et al. |
| 2,945,260 | 7/1960 | Bell. |
| 3,009,204 | 11/1961 | Bingham et al. |
| 3,305,895 | 2/1967 | Ludwig. |
| 3,319,301 | 5/1967 | Ludwig. |
| 3,314,640 | 4/1967 | Snow. |
| 3,358,333 | 12/1967 | Kitchener et al. |
| 3,403,423 | 10/1968 | McMorrow. |

J. HOWARD FLINT, Jr., Primary Examiner

U.S. Cl. X.R.

18—30, 34

PO-1050
(5/69)

UNITED STATES PATENT OFFICE
CERTIFICATE OF CORRECTION

Patent No. 3,523,333          Dated August 11, 1970

Inventor(s) John J. Taylor and William T. Jordan

It is certified that error appears in the above-identified patent and that said Letters Patent are hereby corrected as shown below:

Column 5, claim 6, line 13, after "member" insert --,said bottom mold member--.

SIGNED AND SEALED

MAR 9 1971

(SEAL)
Attest:

Edward M. Fletcher, Jr.
Attesting Officer

WILLIAM E. SCHUYLER, JR.
Commissioner of Patents